Dec. 20, 1938.  A. P. CONANT  2,141,031
COMPACT
Filed June 1, 1937
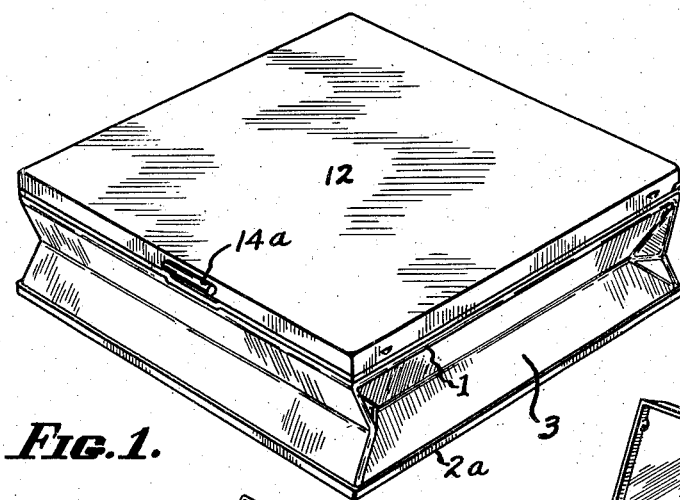
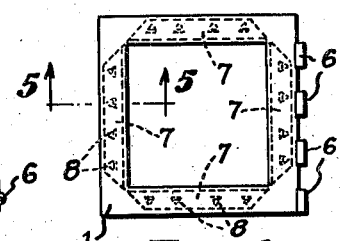
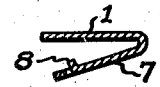
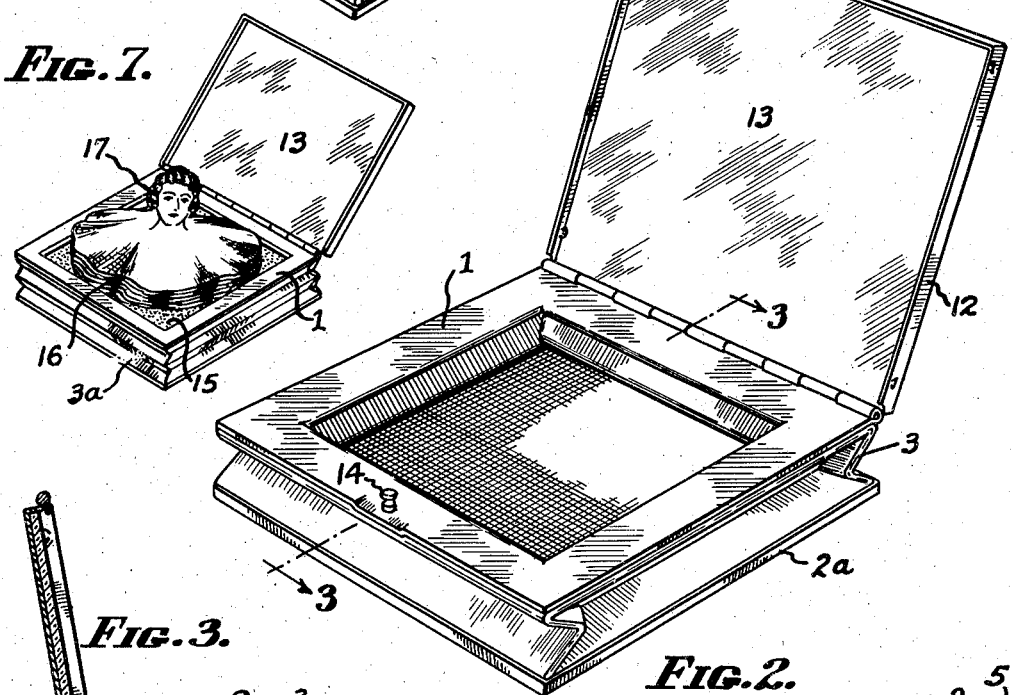
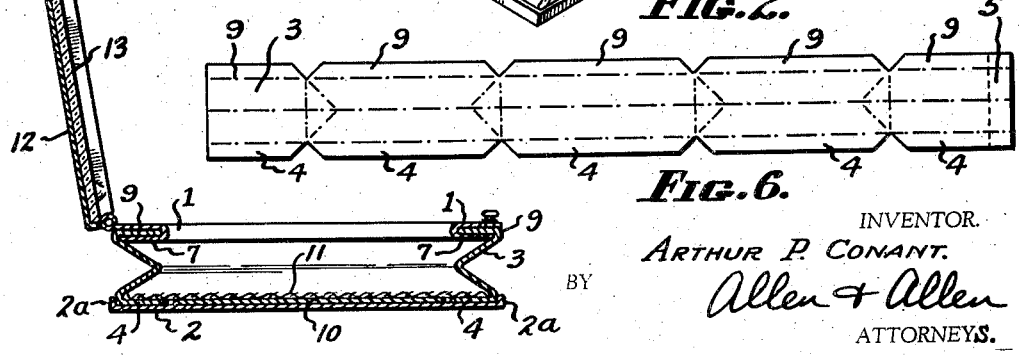
INVENTOR.
ARTHUR P. CONANT.
BY Allen & Allen
ATTORNEYS.

Patented Dec. 20, 1938

2,141,031

UNITED STATES PATENT OFFICE 2,141,031

COMPACT

Arthur P. Conant, Fort Thomas, Ky., assignor to Decometal Incorporated, Dayton, Ky., a corporation of Kentucky Application June 1, 1937, Serial No. 145,801

5 Claims. (Cl. 132—83)

My invention relates to powder and puff containing devices commonly known as compacts. The conventional ladies' compact usually is in the form of a flat receptacle containing a small cake of powder and an applicator in the form of a flat piece of velour. It has been found desirable in recent times to provide loose powder and a compact containing loose powder and an applicator in the form of a fluffy woolen powder puff. A difficulty in this respect lies in the fact that compacts which have been provided for this purpose in the past have been rather bulky and would not conveniently fit into a lady's purse. Attempts have been made to overcome these difficulties by the provision of meshed bags, but this construction is somewhat expensive.

With the above points in mind, it is an object of my invention to provide a lady's powder compact which will have a considerable capacity and yet be compressible and collapsible so that it will not be unduly bulky.

It is a further object of my invention to provide a compact having the above named advantages which will be simple to manufacture and which may be made quite cheaply.

These and other objects of my invention which will be pointed out hereinafter or will be apparent to one skilled in the art upon reading these specifications, I accomplish by that certain construction and arrangement of parts of which I shall now describe an exemplary embodiment.

Reference is now made to the drawing in which

Figure 1 is a perspective view of a compact according to my invention in closed position.

Fig. 2 is a similar view of the same with the lid open.

Fig. 3 is a cross sectional view taken on the line 3—3 of Fig. 2.

Fig. 4 is a plan view of the frame member.

Fig. 5 is a cross sectional view of the same taken on the line 5—5 of Fig. 4.

Fig. 6 is a developed plan view of the material forming the connection between the top and bottom of the compact, and Fig. 7 is a perspective view of an open compact of slightly different form containing a powder puff.

Briefly, in the practice of my invention, I provide a bottom plate and an upper frame member connected together about their peripheries by a material which is adapted to be disposed in accordion pleats so that the upper frame member may be pushed down adjacent the bottom if desired. The upper frame member is provided with hinges whereby the lid is attached thereto. The lid is provided on its inside with a piece of mirror and the container portion proper is lined with some material which will prevent loose powder from leaking out. For closing the compact, any desired form of catch may be employed.

Referring now to the drawing I have shown a compact comprising an upper frame member 1 and a bottom plate member 2 which are connected together about their peripheries by the accordion pleat member 3. In Figs. 1, 2, 3 and 6, this member has been shown to have a single medial fold. However, the number of folds is no limitation upon my invention and in Fig. 7 I have illustrated a compact in which there are two accordion pleats in the member 3a.

In Fig. 6 I have shown the member 3 laid out in continuous form in order to show how the score lines and notches are formed therein. This has been done primarily for illustrative purposes, although an accordion pleat or bellows construction such as is used in bellows cameras may be used. The lower lips 4 of the member 3 are inturned and cemented in any desired manner to the bottom plate 2. The bottom member 2 in the particular embodiment of the invention illustrated has upturned flanges 2a for the purpose of protecting a lower fold between the member 3 and its inturned lips 4. If desired, of course, the flanges 2a may be dispensed with. The lip member 5 overlaps at the other end of the member 3 when the member 3 is folded into operative form.

The upper frame member 1 is shown in more detail in Fig. 4 and is seen to comprise an annular rectangular piece of metal provided along one edge with hinge members 6. The four inner sides of the member 1 are turned under as indicated at 7 and are preferably provided with turned up points 8. The upper folded lips 9 of the member 3 are disposed in between the portions 1 and 7 which are then firmly clamped together, whereby the pointed elements 8 will penetrate and grip the lips 9. The general construction is best seen in Fig. 3. In order to complete the container portion, I prefer to insert in the rectangle formed by the edges of the lips 4 a filler piece 10 of a thickness equal to that of the material from which the member 3 is made. I then cement or otherwise fasten a bottom piece 11 in place over the members 4 and 10 to make a smooth floor for the compartment. The member 11 might, for example, comprise a square piece of cardboard covered with silk. If the member 3 is made of a porous material then, of course, a liner should be used in connection with the member 3 but if the latter is made from leather or similar material, it is unnecessary to use a liner, although a liner may be used for purely decorative purposes. Hinged by the member 6 is a lid 12 having on its inner face a mirror 13. The catch 14, 14a may be of any desired form.

In Fig. 7 I have shown a compact according to my invention having two accordion pleats 3a and containing a quantity of face powder 15 and a powder puff 16. The powder puff may be made ornamental by having a handle portion affixed thereto. The handle portion may be made in the form of a head as shown at 17. The powder puff 16 together with the handle portion 17, particularly if the latter is made from wool or the like, is quite compressible so that if a spring type of catch is used the lid will fly open and the puff will suddenly expand when the catch is pressed thus giving the effect of a "jack-in-the-box".

While I have shown a rectangular compact, it is to be understood that the particular shape employed as well as the number of accordion pleats does not form limitation upon my invention and that compacts may be made according to this invention in various other polygonal or curved outlines. Other modifications of my invention may also be made without departing from the spirit of it.

Having thus described my invention, what I claim as new and desire to secure by Letters Patent is:—

1. A compact comprising a frame member having flanges bent downwardly and outwardly from its inner edges, a base member of the same peripheral shape as the frame member, said members being connected together by means of an accordion pleated member having inturned attachment lips at its upper and lower edges, said upper lips being pinched between said frame member and said flanges, and said lower lips being adhesively attached to said base member.

2. A compact comprising a frame member having flanges bent downwardly and outwardly from its inner edges and having pointed elements struck up from said flanges, a base member of the same peripheral shape as the frame member, said members being connected together by means of an accordion pleated element having inturned attachment lips at its upper and lower edges, said upper lips being pinched between said frame member and said flanges and pierced by said pointed elements, and said lower lips being adhesively attached to said base member.

3. A compact comprising a frame member having flanges bent downwardly and outwardly from its inner edges, a base member of the same peripheral shape as the frame member, said members being connected together by means of an accordion pleated member having inturned attachment lips at its upper and lower edges, said upper lips being pinched between said frame member and said flanges, and said lower lips being adhesively attached to said base member.

4. A compact comprising a frame member having flanges bent downwardly and outwardly from its inner edges and having pointed elements struck up from said flanges, a base member of the same peripheral shape as the frame member, said members being connected together by means of an accordion pleated element having inturned attachment lips at its upper and lower edges, said upper lips being pinched between said frame member and said flanges and pierced by said pointed elements, and said lower lips being adhesively attached to said base member and a lid openably attached to said frame member.

5. A loose powder compact having a rigid frame member and a rigid base member in combination with an accordion pleated element arranged between said frame and base members to permit movement of said members toward one another as the powder in the compact is consumed, said accordion pleated element having inturned attachment lips at its upper and lower edges for attachment to the frame and base members respectively, and a lid openably attached to said frame member.

ARTHUR P. CONANT.